Nov. 6, 1934.  H. M. LEAKE  1,979,948
SEED DRILL
Filed April 11, 1934  2 Sheets-Sheet 1

INVENTOR
Hugh Martin Leake
BY
HIS ATTORNEY

Nov. 6, 1934.    H. M. LEAKE    1,979,948
SEED DRILL
Filed April 11, 1934    2 Sheets-Sheet 2

INVENTOR
Hugh Martin Leake
BY
HIS ATTORNEY

Patented Nov. 6, 1934

1,979,948

UNITED STATES PATENT OFFICE 1,979,948

SEED DRILL

Hugh Martin Leake, Cambridge, England

Application April 11, 1934, Serial No. 719,991
In Great Britain April 12, 1933

7 Claims. (Cl. 111—34)

This invention concerns seed drills adapted to sow measured quantities of seed at spaced intervals.

The primary object of this invention is to provide an effective spacing drill whereby waste of seed and labour can be avoided.

In order that the invention may be clearly understood and readily carried into practice, I have appended hereto drawings, illustrating the same, wherein:—

Figure 1:
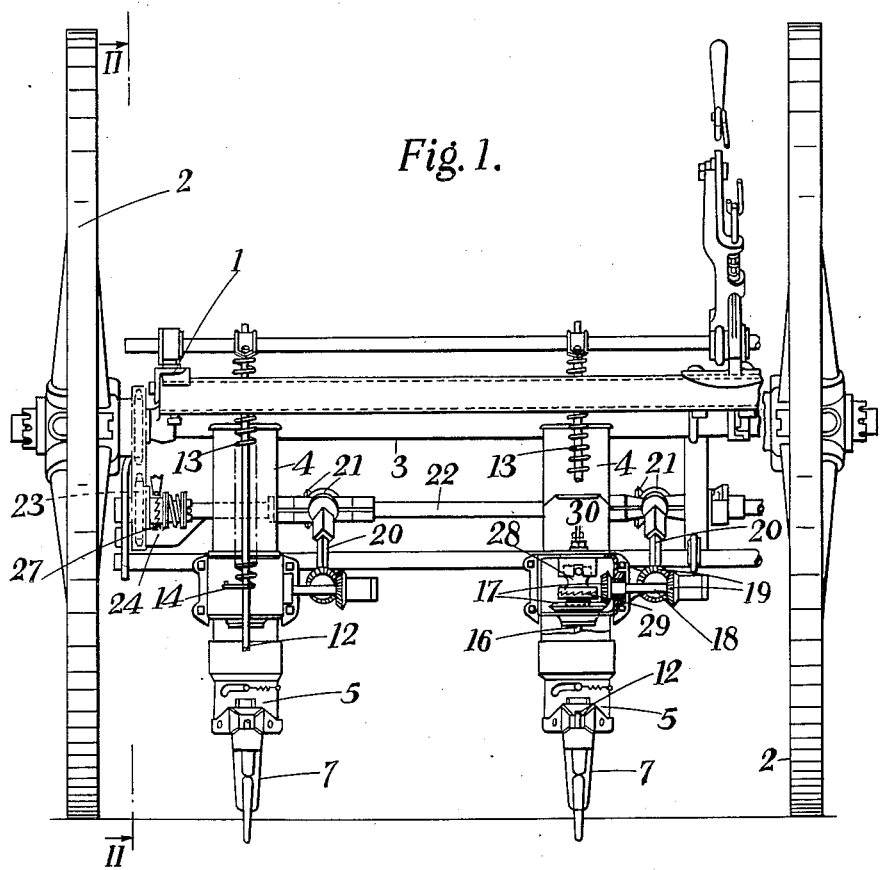
Figure 4:
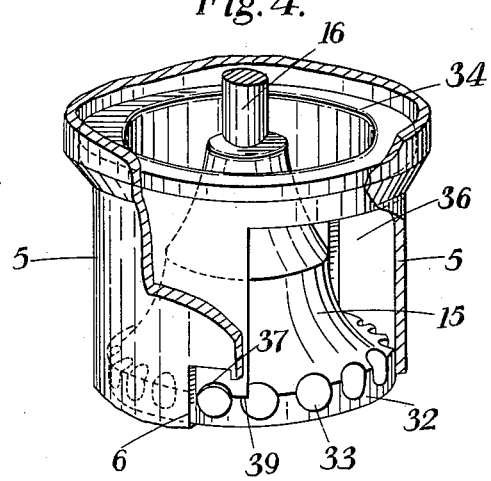
Figure 5:
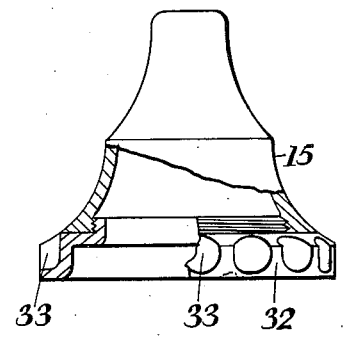
Figure 2:
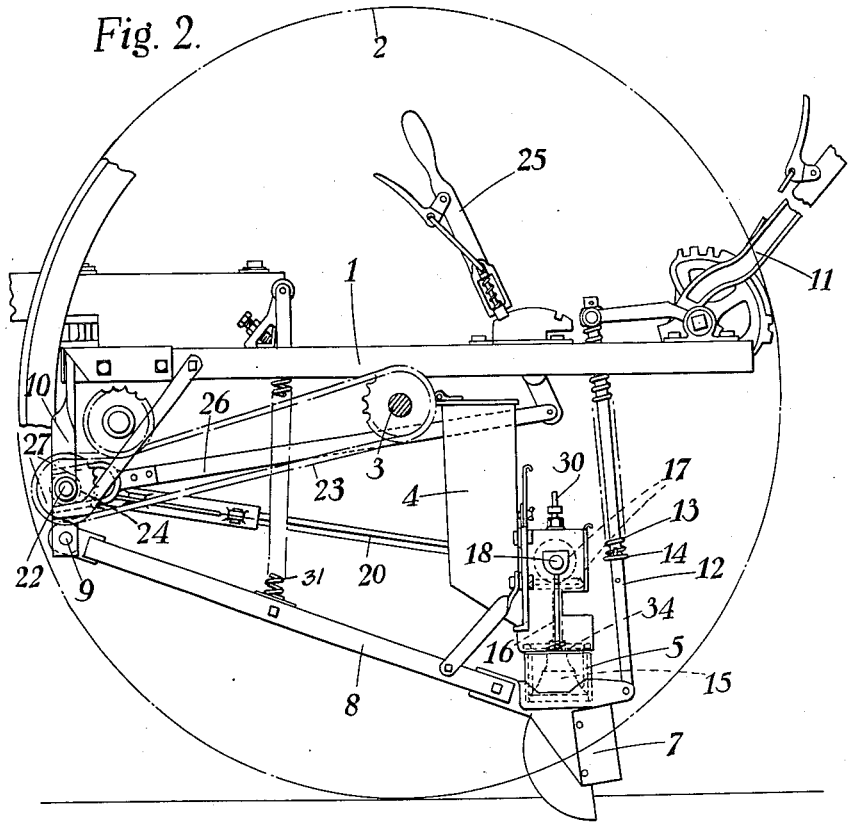
Figure 3:
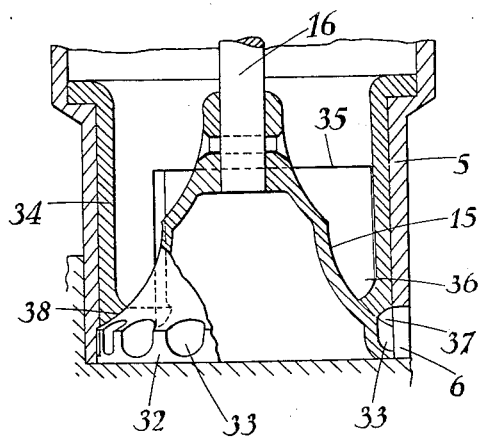

Figure 1 is a rear elevation of a seed drill constructed according to this invention, Figure 2 is a section on line 2—2 Figure 1, Figure 3 is a sectional view of a part of the drill shown in Figures 1 and 2 drawn to an enlarged scale, Figure 4 is a perspective view of the same parts, and Figure 5 shows a modification of one of the parts of the drill.

Referring to the drawings 1 is the frame of a seed drill having this invention applied thereto. 2 are the wheels of the drill and 3 the shaft carrying these wheels. 4 are spaced seed boxes arranged across the drill, and each of these seed boxes communicates at its lower end with a distributor box 5 having a discharge aperture 6 at the lower end of its peripheral wall. A short coulter tube 7 is disposed below said aperture.

The distributor box and seed box are carried at the outer end of an arm 8 pivoted at 9 to a bracket 10 on the frame 1 of the machine, and the arm 8 can be raised or lowered by a lever 11 and a rod 12 connecting the lever and the distributor box together and slidably passing through the lever 11. A spring 13 engages the lever 11 and also a stop 14 on the rod 12. This leaves it possible for the distributor box to rise against the action of the spring 13 in case it meets a boulder or other obstruction.

The arms 8 carrying the distributors are substantially balanced by compensating springs 31 each attached at one end to its arm and attached at the other end to a bracket mounted on the frame 1.

Each distributor box 5 is internally cylindrical and has its axis vertical and a hollow cone or bell like distributor 15 is rotatably co-axially mounted therein. Each distributor 15 is hollow and is fixed upon a vertical shaft 16 driven by bevel gearing 17 (through one of the wheels of which a square part of the shaft 16 slidably passes) from a horizontal shaft 18. The horizontal shaft 18 is in turn driven through bevel gearing 19 by a telescopic non-circular shaft 20 in turn driven by bevel gearing 21 from a shaft 22 extending across the machine. The shaft 22 is driven by a chain drive 23 from one of the ground wheels 2, and a clutch 24, controllable by gear lever 25 and link 26 having a wedge end 27, is provided so that the shaft 22 can be put out of driving engagement with the ground wheel.

The shaft 16 of each distributor is, with the distributor itself, vibratable axially, this being effected by a stationary toothed member 28 and tooth wheel 29 fixed on the shaft 16. Means 30 is provided for raising the member 28 out of engagement with the wheel 29 to stop the cone vibrating or to vary the amount of vibration when desired.

The distributor 15 has a cylindrical rim 32 and then decreases in cross-sectional area in an upward direction, the walls of the distributor preferably being curved inwardly as shown in the drawings.

The rim 32 is provided with a series of equally spaced pockets 33, each pocket being open at the cylindrical face of the rim and also open at its upper end, but being closed at the lower end and at the rear or inner side and the walls of the pockets sloping downwardly and outwardly.

The size of the pockets employed in the ejector and the number thereof will respectively depend upon the size and/or number of seed to be discharged each time a pocket registers with the ejection aperture in the distributor box and upon the spacing that is required in the sowing operation.

Within the distributor box is arranged a part-annular or arcuate normally stationary but movable baffle 34, which is in effect a hollow cylinder having a gap at the lower part as at 35. This baffle is externally a close fit in the distributor box and is of such an internal diameter as to leave a space 36 between the distributor and the baffle to receive seed. The baffle is non-rotatable in the distributor box, is coaxial with the distributor, and at its lower edge is provided with a radial recess 37 extending partially across the edge of the baffle and which registers with the discharge aperture 6 in the distributor box and which lies immediately over a pocket when the latter is discharging.

The lower end of the baffle 34 is thickened at 38 and the lower surface of this thickened part follows closely the contour of the outer curved surface of the rotary distributor 15 and lies very closely adjacent this surface. Also this thickened part 38 is wide enough to cover and close the upper ends of distributor pockets lying thereunder and when any such pocket is registering with the aperture 6 in the distributor box the baffle prevents any seed other than that in the discharging pocket from leaving the distributor box.

The operation of the machine is as follows:—

Seed falls from the seed box 4 into the distributor box and between the baffle 34 and the distributor 15 and, as the latter rotates and vibrates, seed falls through the opening 35 in the baffle and into the pockets of the distributor below this opening; then as the distributor continues to rotate surplus seed is scraped off by the bottom part 39 of the baffle so that a constant quantity of seed is contained by each pocket, and eventually each pocket registers with the discharge aperture 6 in the distributor box, and the seed is discharged into the coulter tube 7 from which it falls to the ground.

The vibration of the distributor reduces the liability of the seeds bridging the pockets and also helps in the free flow of the seed and the free discharge thereof.

It will be seen that the distributor box is arranged very close to the ground so that the seed has only a very short distance to fall whereby there is little possibility of the seed scattering in its fall and a concentrated discharge is ensured.

As shown in Figure 5 the rim 32 of the distributor 15 may be detachable so that it can be replaced by another rim with a different number of pockets therein so that the spacing of the seed can be varied as desired, and to enable this replacement to take place, the lower part 40 of the distributor box is removable.

The spacing of the seed can also be varied by a change in the ratio of the drive between the wheel 2 and the distributor 15.

What I claim is:—

1. A seed drill for sowing measured quantities of seed at spaced intervals and comprising a seed hopper, a distributor box to which said seed hopper is adapted to deliver seed and having a discharge aperture in its peripheral wall, a rotary seed distributor within said box and having a pocket at its periphery adapted to register at intervals with the said discharge aperture, means for rotating said distributor, baffle means adapted to ensure that on registration of said pocket with said discharge aperture only the seed in the pocket is discharged, and means adapted to vibrate said distributor along the axis about which it rotates.

2. A seed drill for sowing seed at spaced intervals and comprising a seed hopper, a distributor box to which said seed hopper is adapted to deliver seed and having a discharge aperture in its peripheral wall, a rotatable seed distributor within said distributor box and having a circular rim and decreasing in cross sectional area upwardly from said rim, the distributor being rotatable about the axis of said rim and the juxtaposed surface of said distributor box corresponding in form to said rim, said rim having a plurality of spaced pockets open only at the periphery and top of said rim, and each of said pockets being adapted to register at intervals with said discharge aperture, means for rotating said distributor, means for vibrating the distributor along its axis of rotation, and baffle means adapted to ensure that on registration of said pocket with said discharge aperture only the seed in the pocket is discharged.

3. A seed drill for sowing measured quantities of seed at spaced intervals and comprising a distributor box having a cylindrical internal surface and having a discharge aperture in its peripheral wall, a seed hopper adapted to deliver seed to said distributor box, a rotary seed distributor having a cylindrical part which is a close but rotatable fit in said distributor box and which cylindrical part is coaxial with the axis of the said cylindrical surface, said distributor being reduced in cross sectional area above cylindrical part and the latter having a plurality of equally spaced peripheral pockets open at the periphery and top only of this part, such pockets having downwardly and outwardly extending walls and each being adapted to register at intervals with said discharge aperture, means for rotating said distributor, means for vibrating the distributor along its axis of rotation, and baffle means adapted to ensure that on registration of said pocket with said discharge aperture only the seed in the pocket is discharged.

4. A seed drill according to claim 3 wherein said baffle comprises a gapped hollow cylinder around and coaxial with said distributor and having its lower edge adjacent the upper surface of said rim and of similar contour to such surface, the inner wall of said baffle being spaced from the outer surface of the distributor to provide a seed space, the lower edge part of the baffle being adapted to isolate the upper end of any pocket coming thereunder from the said seed space.

5. A seed drill according to claim 3 wherein said baffle extends a distance from said discharge aperture in a direction contrary to the direction of rotation of the distributor and is adapted to level off the seed in each pocket prior to its registration with said discharge aperture.

6. A seed drill for sowing measured quantities of seed at spaced intervals and comprising a distribution box of internally cylindrical form and having a lateral discharge aperture in its peripheral wall, a seed hopper adapted to deliver seed to said distribution box, a rotary seed distributor having a rim which is a close rotatable and coaxial fit in said distributor box, said rim having a plurality of equally spaced peripheral pockets open at the periphery and top only of the rim, such pockets having downwardly and outwardly extending walls and each being adapted to register at intervals with said discharge aperture, said distributor being of bell-like form above said rim, means for rotating said distributor, means for vibrating the distributor along its axis of rotation, a gapped hollow cylinder around and coaxial with said distributor and having its lower edge adjacent the upper surface of said rim and of similar contour to such surface, the inner wall of said baffle being spaced from the outer surface of the distributor, and the lower edge of the baffle being adapted to close the upper end of any of said pockets thereunder, said baffle having at its lower edge a seed levelling part extending from the discharge aperture in the distributor box in a direction opposite to the direction of rotation of said distributor.

7. A seed drill according to claim 3 wherein said baffle comprises a gapped hollow cylinder around and coaxial with said distributor and having its lower edge adjacent the upper surface of said rim and of similar contour to such surface, the inner wall of said baffle being spaced from the outer surface of the distributor to provide a seed space, the lower edge part of the baffle being adapted to isolate the upper end of any pocket coming thereunder from the said seed space, the lower edge of the baffle also being provided with a radial recess registering with the said discharge aperture and extending partially through the baffle from the outer surface thereof, and said baffle extending from said discharge aperture a distance in a direction contrary to that of the rotation of the distributor.

HUGH MARTIN LEAKE.